United States Patent
Muthu et al.

(10) Patent No.: US 11,645,086 B2
(45) Date of Patent: May 9, 2023

(54) SYSTEM AND METHOD FOR IMPLEMENTING A FILESYSTEM AGENT MANAGEMENT SOLUTION

(71) Applicant: JPMORGAN CHASE BANK, N.A., New York, NY (US)

(72) Inventors: Chidambaram Muthu, Bengaluru (IN); Palaniappan Subramanian, Bengaluru (IN)

(73) Assignee: JPMORGAN CHASE BANK, N.A., New York, NY (US)

(*) Notice: Subject to any disclaimer, the term of this patent is extended or adjusted under 35 U.S.C. 154(b) by 362 days.

(21) Appl. No.: 16/953,522

(22) Filed: Nov. 20, 2020

(65) Prior Publication Data
US 2021/0149682 A1    May 20, 2021

Related U.S. Application Data

(60) Provisional application No. 62/937,878, filed on Nov. 20, 2019.

(51) Int. Cl.

| | |
|---|---|
| G06F 15/177 | (2006.01) |
| G06F 9/00 | (2006.01) |
| G06F 9/4401 | (2018.01) |
| G06F 8/658 | (2018.01) |
| G06F 11/34 | (2006.01) |
| G06F 9/445 | (2018.01) |
| G06F 8/71 | (2018.01) |

(52) U.S. Cl.
CPC ............ G06F 9/4406 (2013.01); G06F 8/658 (2018.02); G06F 8/71 (2013.01); G06F 9/44505 (2013.01); G06F 11/3476 (2013.01)

(58) Field of Classification Search
CPC .......... G06F 9/4406; G06F 8/658; G06F 8/71; G06F 9/44505; G06F 11/3476; G06F 9/45512; G06F 2201/86; G06F 9/4401; G06F 11/3034; G06F 8/65
See application file for complete search history.

(56) References Cited

U.S. PATENT DOCUMENTS

| | | | |
|---|---|---|---|
| 8,630,981 B1* | 1/2014 | Chirhart ................ | G06F 8/658 707/625 |
| 8,806,471 B2 | 8/2014 | Vidal et al. | |
| 2002/0138720 A1* | 9/2002 | Yu ............................. | G06F 9/24 712/E9.007 |
| 2005/0132179 A1* | 6/2005 | Glaum ................ | G06F 11/1433 713/1 |
| 2007/0271552 A1 | 11/2007 | Pulley | |
| 2008/0216066 A1* | 9/2008 | Oh ......................... | G06F 8/658 717/173 |
| 2009/0144538 A1 | 6/2009 | Duda et al. | |
| 2012/0079471 A1 | 3/2012 | Vidal et al. | |

(Continued)

FOREIGN PATENT DOCUMENTS

| | | | | |
|---|---|---|---|---|
| WO | WO-2005024628 A2 * | 3/2005 | ......... | G06F 11/1433 |

*Primary Examiner* — Xuxing Chen
(74) *Attorney, Agent, or Firm* — Greenblum & Bernstein, P.L.C.

(57) ABSTRACT

An embodiment of the present invention is directed to an innovative approach to installing, upgrading and downgrading the package irrespective of the kernel version during system boot time after an operating system (OS) patching kernel update.

20 Claims, 3 Drawing Sheets

(56) References Cited

U.S. PATENT DOCUMENTS

| | | | |
|---|---|---|---|
| 2012/0110150 A1* | 5/2012 | Kosuru | H04L 41/0863 709/221 |
| 2012/0167073 A1* | 6/2012 | Stevens | G06F 13/4081 717/175 |
| 2013/0298116 A1* | 11/2013 | Ou | G06F 8/61 717/170 |
| 2017/0039372 A1* | 2/2017 | Koval | H04L 67/06 |
| 2017/0094034 A1* | 3/2017 | Banerjee | H04L 67/568 |
| 2022/0147337 A1* | 5/2022 | Michelsohn | G06F 11/1433 |

* cited by examiner

SYSTEM AND METHOD FOR IMPLEMENTING A FILESYSTEM AGENT MANAGEMENT SOLUTION

CROSS REFERENCE TO RELATED APPLICATIONS

The application claims priority to U.S. Provisional Application 62/937,878, filed Nov. 20, 2019, the contents of which are incorporated herein in their entirety.

FIELD OF THE INVENTION

The invention relates generally to a system and method for implementing a filesystem agent management solution.

BACKGROUND OF THE INVENTION

A filesystem agent may represent a client software used for data at rest protection across various operating system (OS) platform filesystems and raw volume data. Each operating system kernel version has an appropriate agent release by a third party product, e.g., data protection service, security service, etc. The filesystem agent may represent a client/server model agent to communicate and handshake with a Data Security Manager (DSM). Data Security Manager represents a centralized cryptographic key management appliance. DSM may run on an embedded hardened lightweight Linux operating system which stores and manages cryptographic keys and access control policies centrally using a Hardware Security Module (HSM).

A filesystem agent, such as Vormetric Filesystem Agent, installed on the each client may manually host and register with the Data Security Manager by a security and system administrator. A Vormetric agent may represent an encryption agent. With a successful registration of the client on the DSM, the DSM and client may communicate and handshake with each other (e.g., two way communication). Simple Filesystem Data and Raw Volume data may be guarded through a filesystem agent on a client host from the DSM. Guarding a filesystem on the client host may involve guarding respective client host filesystem data with an encryption policy and may be referred to as a "guard point." The encryption policy may support AES Cryptography Symmetric/Asymmetric Key and Access Control Matrix, for example.

Applications and databases may run on a guarded filesystem. Input/output calls to the guarded filesystem may be processed through a Vormetric Filesystem Client Agent Daemon called "secfsd," for example. Whenever there is a change in policy in DSM for a client host, DSM may push that policy update to a respective client host by communicating through "vmd" daemon which may run on a client host since server boot time.

However, unauthorized users or processes cannot access the guarded filesystem or perform any activity. If an activity has to be carried out on the guarded filesystem, an agent service has to be stopped on the respective local host to access the filesystem. The same or similar methodology may apply if a client agent has to be upgraded to a next version, downgraded to a lower version, and uninstalled. Performing a filesystem agent upgrade on a client host with the active encrypted guard point generally involves 4-6 hours of maintenance downtime and weeks or months planning. Due to this complexity, many client agent software running on client hosts are not upgraded. This results in increased risk breaks, vulnerability incidents, and other performance issues.

These and other drawbacks exist.

SUMMARY OF THE INVENTION

According to an embodiment, the invention relates to a system that implements a filesystem agent management tool that upgrades, downgrades or installs a software package during a system boot. The system comprises: a repository that stores filesystem data; an interface that communicates via a communication network; and a server comprising a computer processor, coupled to the repository and the interface, wherein the computer processor is further programmed to perform the steps of: determining whether an agent compatible version exists in the repository for a patch kernel; patching an operating system and upgrading a wrapper package, wherein the wrapper package comprises a list of files relating to a service and further comprises a customized boot script and a vendor installer binary; initiating a system boot process that comprises executing the customized boot script; performing a comparison between a vendor installer binary version and a running agent version; responsive to the comparison, installing a downgrade service or an upgrade service, wherein the downgrade service comprises removing an existing vendor package and executing the vendor installer binary and wherein the upgrade service comprises executing the vendor installer binary that upgrades a vendor package; validating the downgrade service or the upgrade service; logging the validating step as an event in a log; and continuing the system boot process which initiates one or more applications and operating system services.

According to another embodiment, the invention relates to a method that implements a filesystem agent management tool that upgrades, downgrades or installs a software package during a system boot. The method comprises the steps of: determining whether an agent compatible version exists in the repository for a patch kernel; patching an operating system and upgrading a wrapper package, wherein the wrapper package comprises a list of files relating to a service and further comprises a customized boot script and a vendor installer binary; initiating a system boot process that comprises executing the customized boot script; performing a comparison between a vendor installer binary version and a running agent version; responsive to the comparison, installing a downgrade service or an upgrade service, wherein the downgrade service comprises removing an existing vendor package and executing the vendor installer binary and wherein the upgrade service comprises executing the vendor installer binary that upgrades a vendor package; validating the downgrade service or the upgrade service; logging the validating step as an event in a log; and continuing the system boot process which initiates one or more applications and operating system services.

The system may include a specially programmed computer system comprising one or more computer processors, interactive interfaces, electronic storage devices, and networks. The computer implemented system and method described herein provide unique advantages to entities, organizations and other users, according to various embodiments of the invention. With an embodiment of the present invention, security and stability of an infrastructure estate may be achieved and maintained. An embodiment of the present invention provides convenient patching with a number of hosts through an innovative automation tool. The innovative automation tool and corresponding methodology reduce a typical two week process to just a few hours or less. Special or extra maintenance windows are not required to perform an agent upgrade as it is tied to an operating system patching schedule.

With an embodiment of the present invention, agent upgrade may be transparent with minimal or no noise during patching and post patching processes. Kernel version and agent version compatibility issues may be addressed at a wrapper package level. An embodiment of the present invention may be utilized through existing operating system tools to achieve transparency in maintaining agent version. Accordingly, there is no need to purchase and integrate external tools. The self-manageable solution of an embodiment of the present invention provides cost efficiencies and improves reliability.

With an embodiment of the present invention, data security may be ensured and guaranteed for customers by maintaining an updated agent version. Further, there is no extra downtime apart from a default maintenance window. An embodiment of the present invention provides a stable and secure environment where agent upgrade/downgrade is made transparent. If issues are identified, a production team may be notified through a log system so that threats and vulnerability may be promptly addressed and mitigated. An embodiment of the present invention provides a complete end-to-end solution towards installation, upgrade, downgrade, security patching and mitigating risk breaks in an automated fashion. The solution may be applied across various platforms and operating systems such as Advanced Interactive Executive (AIX), Unix, Windows, etc.

These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION OF THE PREFERRED EMBODIMENT(S)

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to addressing risk issues transparently and enabling an entire infrastructure to maintain the latest agent software in a convenient and efficient manner. With current systems, software dependent on kernel specific versions will need to stop all upstream/downstream processes to upgrade/downgrade the underlying software package. This includes stopping all the downstream/upstream processes running on dependent guarded filesystems where existing processes require sequential execution and validation of each manual steps. Moreover, current systems experience complexities in installing, downgrading and upgrading a package, such as a RPM (Red Hat Package Manager). This is a time-consuming process that requires dedicated resources and investments.

Current systems experience an increased vulnerability incident for platform related filesystem agents, e.g., Vormetric Filesystem Agents, etc. As a result, operation teams are required to coordinate with business, database, application and patching teams to host downtime to upgrade the filesystem agent on each host. However, reserving downtime from businesses to upgrade these software agents is a time consuming and costly process. Oftentimes, operation teams are flooded with known bugs and further experience an increase in incidents due to outdated versions. An exemplary illustration involves Vormetric Filesystem Agents. Other filesystem agents may be realized in accordance with the various embodiments of the present invention.

With current systems, a number of operations resources are required throughout the activity to gracefully shutdown and/or startup the processes before and/or after the activity. As a result, hundreds and thousands of hosts run with outdated filesystem agent versions.

Figure 1:
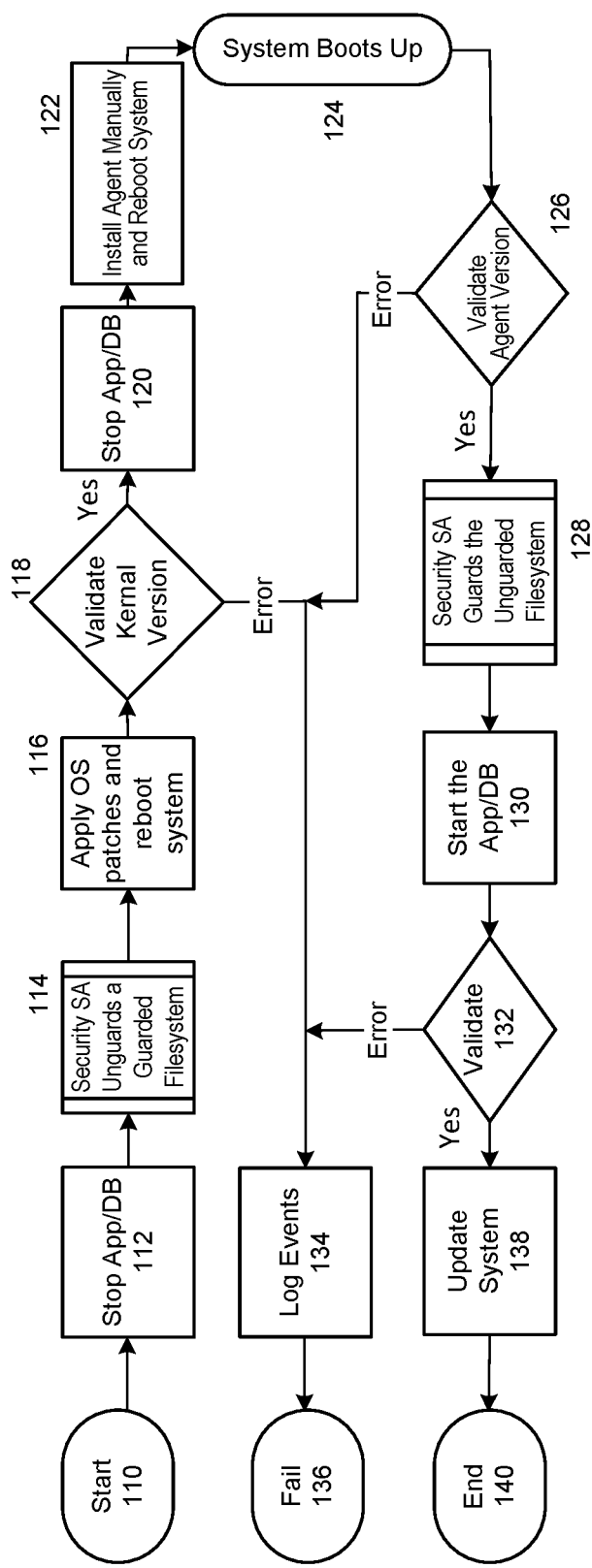
FIG. 1 is an exemplary process map.

FIG. 1 is an exemplary process map. The process may start at 110. An application and/or database may stop at 112. At 114, security software agent (SA) may un-guard a guarded filesystem. At 116, operating system (OS) patches may be applied and the system may reboot. At 118, kernel version may be validated. At 120, the application and/or database may stop. At 122, an agent may be installed manually and the system may reboot. At 124, the system may boot up. At 126, agent version may be validated. At 128, security SA may guard the unguarded filesystem. At 130, the application and/or database may start. At 132, the process may validate. If an error is detected, events may be logged at 134 and process fails at 136. The system may update at 138. The process may end at 140.

Filesystem agents (e.g., Vormetric Filesystem Agents, etc.) may be manually installed on host systems by an operations team. With prior and post installations of an agent, the upstream application needs to be stopped and servers need to be rebooted for the agents to take effect. Managing the life cycle of the agent is generally a tedious task for operations team. In addition, identifying and getting a few hours maintenance window from any business is difficult. Changes need to be performed on a lower environment then followed by a production environment if there are no reported issues on the lower environment. However, running a lower version agent on higher/latest version OS kernel is incompatible and not recommended. This would also break application startup as applications are unable to access the encrypted data as the underlying filesystem agent service may be down. For example, Vormetric Filesystem Agent versions may be kernel version specific. If there is a mismatch in version, the Vormetric Kernel Modules may not load in the higher version kernel or may cause kernel panic/crash which eventually causes application/database data to get corrupted.

According to an exemplary illustration, Vormetric Filesystem Agent supports Data at Rest encryption in various platforms, e.g., Linux, Solaris, HP-UX, AIX, etc. Entities face the agent upgrade issue on platforms, such as Linux, HP UX, AIX, etc. The number of infrastructure resources and time spent on debugging and fixing are countless.

Figure 2:
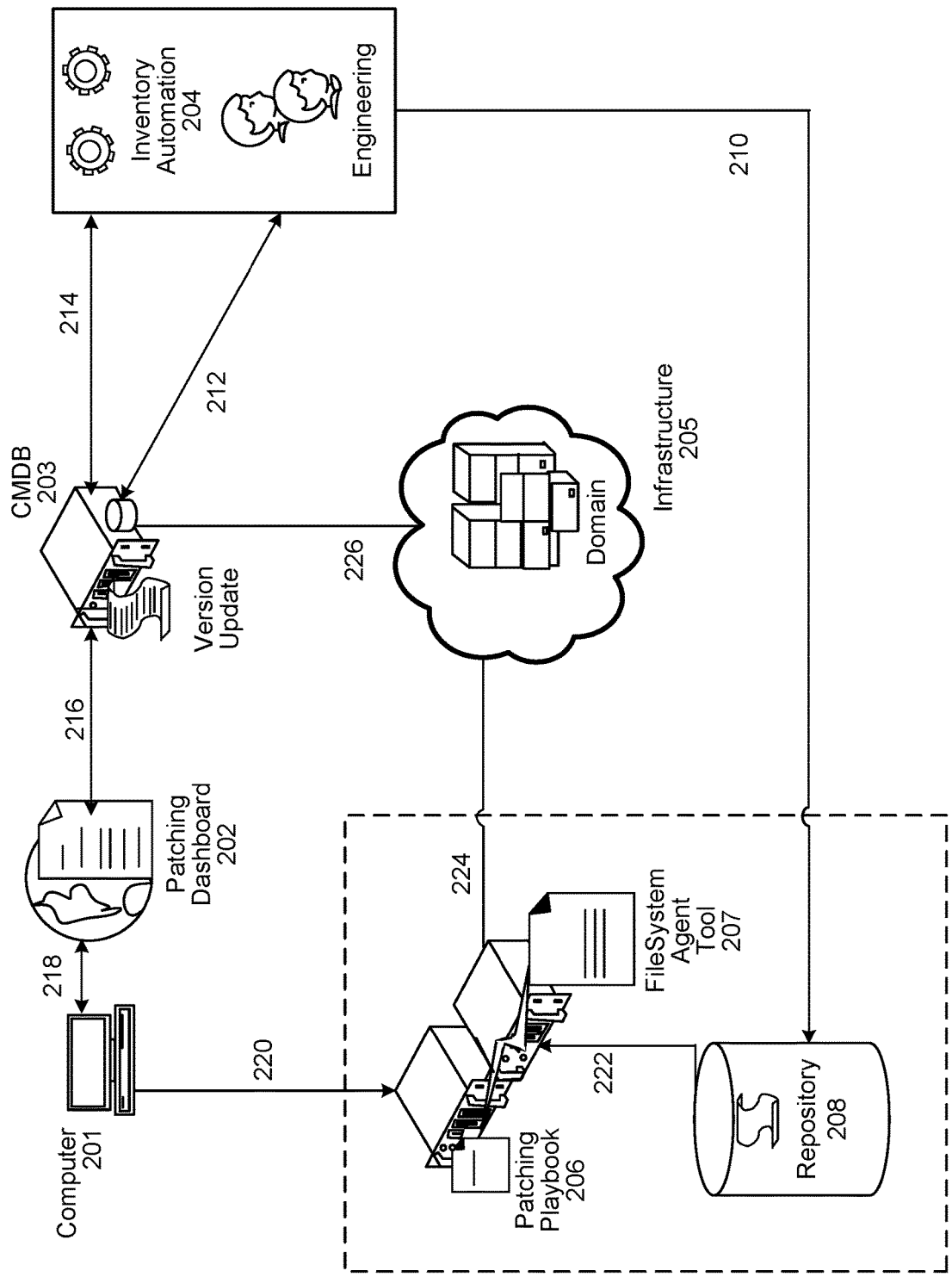
FIG. 2 is a system architecture of a filesystem agent management solution, according to an embodiment of the present invention.

FIG. 2 is a system architecture of a filesystem agent management solution, according to an embodiment of the present invention. FIG. 2 illustrates interactions involving User Device (Computer 201), Patching Dashboard 202, Repository/Database (CMDB 203), Inventory 204, Infrastructure 205, etc. An embodiment of the present invention is directed to Filesystem Agent Tool 207 that upgrades, downgrades and/or installs a software package during a system boot. For example, Filesystem Agent Tool 207 may upgrade a filesystem agent consistent and in line with a kernel version of an operating system.

At step 210, encryption engineering may certify a vendor package and release to production. This may occur on a periodic basis, e.g., every quarter, etc. At step 212, Policy Identifier (ID) and Repository (CMDB 203) may be updated with the package. At step 214, an inventory automation 204 update may execute on a regular basis, e.g., daily, etc. At step 216, Patch Lifecycle Management Dashboard (PLM DBD), represented by 202, may fetch an agent breaks report from Configuration Management Database (CMDB) Policy. In addition, PLM DBD may fetch an inventory host list. At step 218, PLM administrator may download a consolidated list for patching. At step 220, PLM administrator may execute scripts or workflows, such as (Ansible) patching playbooks 206, for patching with the downloaded host list. At step 222, a microservice may automatically download the package from Repository 208 and apply it on a target server and reboot the host, as shown by 224. At step 226, a policy engine may scan for breaks and publish the breaks per host or application.

An embodiment of the present invention is directed to implementing a Wrapper Package by bundling a Vendor Installer Binary file. The Vendor Installer Binary file may contain a vendor agent, such as a Vendor Agent RPM. The Wrapper Package may install a vendor core binary package at the time of reboot before any services comes up. The Wrapper Package may contain automated scripts which install an independent service, such as a secfsd-upgrade, on the existing system along with the native services, e.g., native Vormetric services.

An embodiment of the present invention may be directed to a PLM Dashboard integrated with a policy engine to retrieve policy breaks which trigger and/or enable agent patching status. If any failures occurred in patching, an error log may be updated in the system messages. A log analyzer tool may create a ticket automatically to the production team. An embodiment of the present invention provides convenient patching with any number of hosts with no to minimal manual intervention required. A two week scope process may be reduced to just a few hours. In addition, there is no need for teams, such as Application, Database, SA and Security Administration and Business teams, to be on call for shutdown and/or startup of the services. For example, Security SA teams do not need to coordinate for maintenance windows or further follow up on agent upgrades.

An embodiment of the present invention may utilize a default maintenance window for upgrading outdated agents along with OS Patching. As a result, stability and security of the environment may be improved by maintaining updated patch levels. The solution may fit any vendor product by adopting a similar infrastructure or process in the field of infrastructure software security.

For example, a package, such as RPM, may contain a list of files related to a service. An exemplary illustration of an embodiment of the present invention may include a Wrapper RPM package. In this example, Wrapper Package RPM may include customized scripts called secfs-upgrade and a Vendor installer binary. When the wrapper package is installed, it extracts the scripts and vendor core binary under a directory, e.g., /opt/vormetric/directory, and also install boot script "secfs-upgrade" under run control scripts in RedHat6.X/5.X, for example. In RedHat7.X, the same service may get installed under systemd. Secfsd-upgrade service may start before actual native secfs/App/DB service starts. Secfsd-Upgrade service may get disabled post upgrade/downgrade of the file agent (e.g., Vormetric Filesystem Agent) during the reboot and until the next version of the wrapper packages gets installed.

"secfs" may represent a Secure File System module. This module may be a file system layer that enforces an access and encryption policy upon selected data on end-user systems. The policy may specify a key to be used when writing data to disk and while reading data from disk. This module may contain the Vormetric Encryption Expert Crytographic Library which provides cryptographic services. This is one example of a secure file system module. Other variations may be realized in accordance with the embodiments of the present invention.

"secfsd-upgrade" represents a script that determines an action based on the installed and available binary version. It compares the versions and then installs, upgrades or downgrades during next reboot. This is one example of a script. Other variations may be realized in accordance with the embodiments of the present invention.

Depending upon the wrapper package version, the underlying vendor installer binary package will get to the same level. For example, a wrapper package may be at higher version 6.0.3 and a running vendor package version is at a lower version 6.0.1. On the next system reboot, the vendor package will get upgraded to 6.0.3. In a similar manner, if the wrapper package is at a lower version and the running vendor package is at higher version then the running vendor package will be removed and the respective vendor package version will be installed at boot time.

According to an exemplary illustration, the patching playbook may look for availability of appropriate wrapper package for the patching kernel version. If the package is not identified in the repository, the Operating System patching process may stop with an error message about the incompatibility. The wrapper package may be uploaded to each respective version repository and any Linux client may make use of the package from the repository.

Figure 3:
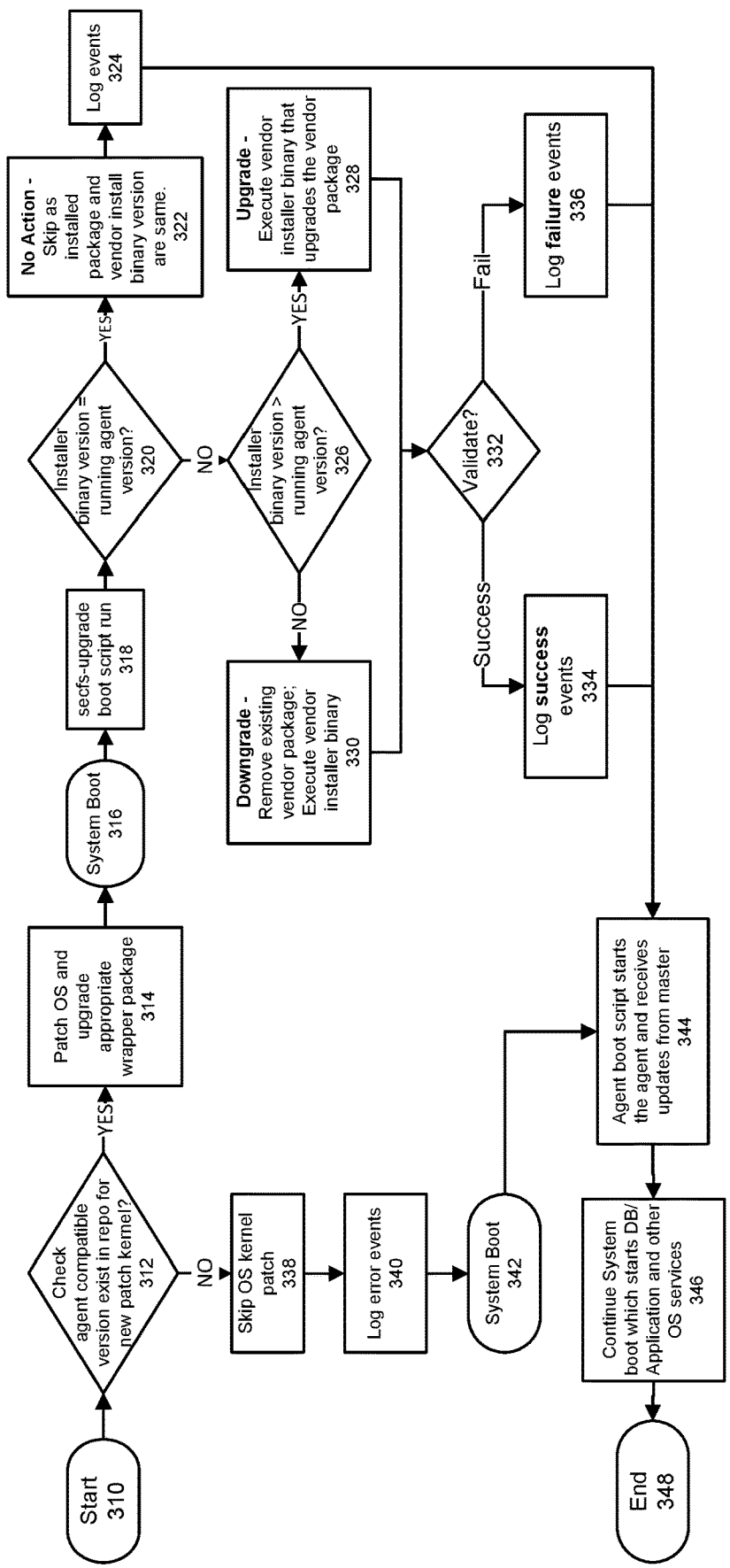
FIG. 3 is an exemplary process flow, according to an embodiment of the present invention.

FIG. 3 is an exemplary process flow, according to an embodiment of the present invention. The process may start at step 310. At step 312, an embodiment of the present invention may check to determine whether an agent compatible version exists in a repository (e.g., Repository 208, FIG. 2) for a new patch kernel. If yes, an embodiment of the present invention may patch OS and upgrade an appropriate wrapper package at step 314. In this example, a wrapper may contain the installer binary file and the secfs-upgrade boot up script. At step 316, a system boot may be initiated. At step 318, a boot script may run. In this example, a secfs-upgrade boot script may run. Other upgrade boot scripts may be executed.

At step 320, it may be determined whether an installer binary version is a running an agent version. If yes, no action may be taken at step 322. For example, no action may involve a skip action as installed package and vendor install binary versions are the same. Events may be logged at 324. If no, it may be determined whether the installer binary version is greater than the running agent version at step 326. An embodiment of the present invention may compare the installed version and the required version. If yes, an upgrade may be performed. The upgrade may involve executing vendor installer binary that upgrades the vendor package at step 328. If no, a downgrade may be performed. The downgrade may involve removing an existing vendor package and executing a vendor installer binary at step 330. A validation may be performed at step 332. If validation is successful, the event may be logged as a success event. If validation is not successful, the event may be logged as a failure event.

At step 338, OS kernel patch may be skipped. This step may occur when there is no agent compatible version. At step 340, error events may be logged. At step 342, a system boot may be performed. At step 344, an agent boot script may start the agent and receive updates from a master. At step 346, the system boot may continue which starts database/application and other OS services. The process may end at 348.

An embodiment of the present invention is directed to a unique approach to installing, upgrading and downgrading the package irrespective of the kernel version during system boot time after OS patching kernel update.

Other embodiments, uses, and advantages of the invention will be apparent to those skilled in the art from consideration of the specification and practice of the invention disclosed herein. The specification and examples should be considered exemplary only, and the scope of the invention is accordingly not intended to be limited thereby.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments of the present invention support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, JavaScript and/or Python. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system that implements a filesystem agent management tool that upgrades, downgrades or installs a software package during a system boot, the system comprising:
    a repository that stores filesystem data;
    an interface that communicates via a communication network; and
    a server comprising a computer processor, coupled to the repository and the interface, wherein the computer processor is further programmed to perform the steps of:
        determining whether an agent compatible version exists in the repository for a patch kernel;
        initiating a patching process for an operating system and upgrading a wrapper package, wherein the wrapper package comprises a list of files relating to a service and further comprises a customized boot script and a vendor installer binary;
        initiating a system boot process that comprises executing the customized boot script;
        performing a comparison between a vendor installer binary version and a running agent version;
        responsive to the comparison, installing a downgrade service or an upgrade service, wherein the downgrade service comprises removing an existing vendor package and executing the vendor installer binary and wherein the upgrade service comprises executing the vendor installer binary that upgrades a vendor package;
        validating the downgrade service or the upgrade service;
        logging the validating step as an event in a log; and
        continuing the system boot process which initiates one or more applications and operating system services.

2. The system of claim 1, wherein the upgrade service starts before an actual native service starts and wherein the upgrade service gets disabled post upgrade of a filesystem agent during a reboot and until a next version of the wrapper package installs.

3. The system of claim 1, wherein the downgrade service starts before an actual native service starts and wherein the downgrade service gets disabled post upgrade of a filesystem agent during a reboot and until a next version of the wrapper package installs.

4. The system of claim 1, wherein the upgrade service comprises a secfsd-upgrade service and patching playbook to automate.

5. The system of claim 1, wherein the customized boot script comprises a secfs-upgrade boot script.

6. The system of claim 1, wherein the interface comprises a Patch Lifecycle Management (PLM) dashboard that retrieves policy breaks and agent patching status.

7. The system of claim 1, wherein the interface is coupled to a log analyzer tool.

8. The system of claim 1, wherein the one or more applications comprises a database application.

9. The system of claim 1, wherein the event comprises one of: a success event and a failure event.

10. The system of claim 1, wherein the wrapper package further extracts scripts and a vendor core binary from a directory.

11. A method that implements a filesystem agent management tool that upgrades, downgrades or installs a software package during a system boot, the method comprising the steps of:
    determining whether an agent compatible version exists in the repository for a patch kernel;
    patching an operating system and upgrading a wrapper package, wherein the wrapper package comprises a list of files relating to a service and further comprises a customized boot script and a vendor installer binary;
    initiating a system boot process that comprises executing the customized boot script;
    performing a comparison between a vendor installer binary version and a running agent version;
    responsive to the comparison, installing a downgrade service or an upgrade service, wherein the downgrade service comprises removing an existing vendor package and executing the vendor installer binary and wherein the upgrade service comprises executing the vendor installer binary that upgrades a vendor package;
    validating the downgrade service or the upgrade service;
    logging the validating step as an event in a log; and
    continuing the system boot process which initiates one or more applications and operating system services.

12. The method of claim 11, wherein the upgrade service starts before an actual native service starts and wherein the upgrade service gets disabled post upgrade of a filesystem agent during a reboot and until a next version of the wrapper package installs.

13. The method of claim 11, wherein the downgrade service starts before an actual native service starts and wherein the downgrade service gets disabled post upgrade of a filesystem agent during a reboot and until a next version of the wrapper package installs.

14. The method of claim 11, wherein the upgrade service comprises a secfsd-upgrade service and patching playbook to automate.

15. The method of claim 11, wherein the customized boot script comprises a secfs-upgrade boot script.

16. The method of claim 11, wherein the interface comprises a Patch Lifecycle Management (PLM) dashboard that retrieves policy breaks and agent patching status.

17. The method of claim 11, wherein the interface is coupled to a log analyzer tool.

18. The method of claim 11, wherein the one or more applications comprises a database application.

19. The method of claim 11, wherein the event comprises one of: a success event and a failure event.

20. The method of claim 11, wherein the wrapper package further extracts scripts and a vendor core binary from a directory.

* * * * *